April 26, 1966 J. G. VLASIC ETAL 3,247,715

TEMPERATURE MEASUREMENT DEVICE FOR SMALL CONDUIT

Filed June 18, 1962

JOHN A. PERRY
JOHN G. VLASIC
*INVENTORS*

*BY*

Adams, Forward & McLean
ATTORNEYS

United States Patent Office
3,247,715
Patented Apr. 26, 1966

3,247,715
TEMPERATURE MEASUREMENT DEVICE FOR SMALL CONDUIT

John G. Vlasic, Harvey, and John A. Perry, Lansing, Ill., assignors to Sinclair Research, Inc., New York, N.Y., a corporation of Delaware
Filed June 18, 1962, Ser. No. 203,372
4 Claims. (Cl. 73—362)

Our invention relates to a measurement of temperature of fluids flowing through thin conduits and in particular to capillary-column gas chromatography.

In typical packed column gas chromatography systems temperature measurements have heretofore been made by thermistors mounted on hermetic seals housed in chambers of relatively large volumes. We have discovered that the above equipment produces turbulence and remixing of separated gases resulting in inaccurate measurements when employed in capillary-column systems. This is due to the fact that the small volumes of each component of gas flowing through the capillary-column system cannot fill the chamber required to house the relatively bulky thermistor and the hermetic seal upon which it is mounted.

Our invention provides apparatus for measuring the temperature of fluids flowing through a small conduit. We provide a resilient dielectric body divided along an interfacial plane into a pair of gaskets having confronting surfaces in sealing contact. A passageway extends through the dielectric body opening at opposite ends of the body and is provided with an enlarged section at the interfacial plane. A thermoelectric element is centrally located within the enlarged section of the passageway and has electrical leads extending therefrom and positioned along the interfacial plane between the confronting surfaces of the body. The passageway is of such shape and dimensions that with the thermoelectric element located within the enlarged section the passageway has a substantially uniform effective cross-sectional area and substantially streamline flow characteristics along its length. Electrical contact members extend through the body so that a surface portion of each of the members is located in the interfacial plane and a contact member is in electrical contact with each of the electrical leads extending from the thermoelectric element.

Advantageously, the dielectric body of our invention can be a pair of gaskets having confronting surfaces in sealing contact along the interfacial plane. The apparatus of our invention can also be provided with means retaining the confronting surfaces in sealing contact and means retaining the leads and contact members in electrical contact. In a particularly advantageous embodiment of our invention the means retaining the surfaces in sealing contact and the means maintaining the leads and contact members in electrical contact can be the same.

In one particular embodiment of our invention the dielectric body comprises a pair of coaxially disposed cylindrical, deformable dielectric discs or gaskets in which the confronting surfaces are substantially flat. The discs are provided with axial passageways extending through each disc and registering at the interfacial plane between the confronting surfaces. The portions of the passageways immediately adjacent the confronting surfaces are of enlarged diameter thereby defining an enlarged section at the interfacial plane. A bead shaped thermistor of comparatively small dimensions relative to the enlarged section is positioned centrally within the enlarged section and a pair of electrical leads extend outwardly therefrom between the confronting surfaces of the discs. The electrical leads extend in diametrically opposite directions a lesser distance from the axis of the passageways than the periphery of the discs. A pair of electrical contact members are also provided on diametrically opposite sides of the axial passageways. These contact members are disposed generally parallel to the axial passageways and extend through one of the discs terminating at one of their ends flush with the confronting surface of such disc while their other ends extend beyond the opposite side of such disc. A pair of casing members having mating surfaces enclose the pair of discs and one of the casing members is provided with a pair of openings through which the electrical contact members extend. Insulating means is provided which electrically insulates the contact members from the casing member. Conduit means extend through each casing member and are in fluid tight communication with the axial passageways through the discs at the ends of the passageways remote from the confronting surfaces of the discs. Means are also provided which cooperate with the casing members urging their mating surfaces together which in turn urge the confronting surfaces of the discs together in sealing contact thereby maintaining the electrical leads in electrical contact with the electrical contact members.

To install such an embodiment of our invention in a capillary-column gas chromatography system, one of the conduits communicating with an axial passageway is connected to conduct the output gas from the column through our apparatus while the other conduit is connected to a vent. The electrical contact members are connected to an appropriate electrical circuit responsive to current variations through the thermistor. In operation, each variation detected by the electrical circuit is recorded in a form useful for analysis.

The dielectric body, gaskets or discs of our apparatus can be fabricated from any of the well known resilient, deformable dielectric materials such as natural or synthetic rubber or polymeric plastic materials including polyethylene and polyisobutylene. The particular material selected, of course, should be capable of withstanding the high temperatures encountered in gas chromatography operations without distortion and should not absorb or adsorb the gases with which it comes into contact. Preferably, the dielectric body is made from a material such as polytetrafluoroethylene or a copolymer of hexafluoropropylene and vinylidene fluoride. The polytetrafluoroethylene is commercially available under the trade name "Teflon TFE" and the copolymer is available under the trade name of "Viton." Employment of either of these two materials permits operation at temperatures up to about 500 or 600° F.

The electrical contact members can be fabricated from any material possessing the desired property of good electrical conductivity such as, for example, copper.

In the embodiment of our invention employing casing members to hold the other components of the apparatus together the casing members can be fabricated from a material having the requisite rigidity and ability to withstand the stress to which these members are subject. In addition, the material must readily lend itself to the machining operations necessary to produce the small diameter openings through such members. Suitable materials include for example the more rigid plastic resins and metals. Preferably, the casing members can be fabricated from stainless steel.

The insulating means which electrically insulates the contact members from the casing members can be any suitable dielectric material such as the materials employed in the dielectric body or discs.

In order to describe the apparatus of our invention more completely reference is made to the attached drawing in which.

Figure 2:
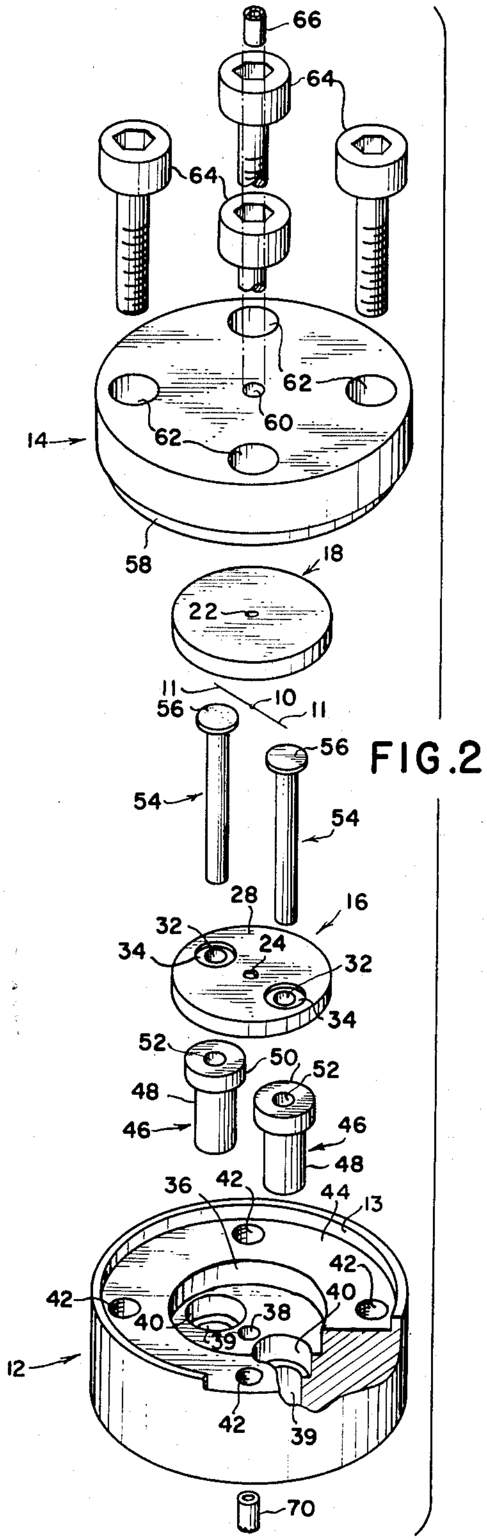
FIGURE 2 is an exploded isometric view of the apparatus of FIGURE 1.

The apparatus illustrated in the drawing includes a thermistor 10 having a pair of electrical leads 11 extending diametrically outward therefrom, a lower cylindrical casing member 12 having an upwardly extending annular, peripheral flange 13, an upper cylindrical casing member 14, a lower cylindrical gasket 16 and an upper cylindrical gasket 18. Gaskets 16 and 18 are disposed confronting each other. The lower and upper gaskets 16 and 18 are each provided with an axial passageway 20 and 22, respectively, extending through the gaskets. As can be seen more readily in FIGURE 3, the axial passageways 20 and 22 have enlarged, flared openings 24 and 26, respectively, at the confronting upper and lower surfaces 28 and 30, respectively, of gaskets 16 and 18. Gasket 16 is also provided with a pair of openings 32 extending therethrough and disposed parallel to axial passageway 20 such that axial passageway 20 is intermediate openings 32 and the axes of openings 32 and passageway 20 are coplanar. At the confronting surface 28 of gasket 16 the openings 32 are each surrounded by a counterbore 34 of slightly larger diameter than the openings 32.

The lower casing member 12 has a central counterbore 36 of the same diameter as the outer diameter of gaskets 16 and 18 and a depth somewhat less than the combined height of gaskets 16 and 18. Centrally disposed in counterbore 36 is an axial passageway 38 extending through lower casing member 12. Casing member 12 is also provided with a pair of openings 39 extending therethrough and disposed parallel to axial passageway 38 such that axial passageway 32 is intermediate openings 39 and the axes of openings 32 and passageway 38 are coplanar. The openings 39 open into counterbore 36 and are aligned with openings 32 of gasket 16. The ends of openings 39 within counterbore 36 are each surrounded by a counterbore 40 of slightly larger diameter than openings 39. Four threaded holes 42 also extend through casing member 12. These threaded holes 42 are spaced an equal radial distance from the axis of casing member 12 and are spaced 90° apart. Threaded holes 42 also open on the upper side of casing member 12 along the annular surface 44 defined by the edge of counterbore 36 and flange 13.

Shown immediately above casing member 12 in FIGURE 2 are a pair of electrode insulators 46 having cylindrical bodies 48 and enlarged cylindrical caps 50 at their upper ends. The insulators 46 are also provided with axial holes 52 extending therethrough. The insulators 46 are dimensioned so that the cylindrical bodies 48 can be received in and extend through the openings 39 in casing member 12 while the caps 50 completely fill counterbores 40 about openings 39.

In FIGURE 2 a pair of generally cylindrical electrodes 54 having flat heads 56 are shown immediately above the lower gasket 16. The electrodes 54 are of such size that they can extend through the openings 32 in gasket 16 and the axial holes 52 in electrode insulators 46 with the heads 56 completely filling counterbores 34 about openings 32.

The lower surface of upper casing member 14 is provided with a cylindrical coaxial extension 58 of such diameter as to be readily received within flange 13 of lower casing member 12. Extension 58 extends axially from casing member 14 a distance approximately equal to the height of flange 13 of casing member 12. Casing member 14 is also provided with an axial passageway 60 extending therethrough. Four holes 62 extend through casing member 14. These holes 62 are disposed 90° apart and are spaced the same radial distance from the axis of casing member 14 as holes 42 are spaced from the axis of casing member 12.

Shown immediately above casing member 14 in FIGURE 2 are four socket head bolts 64 adapted to extend through the holes 62 in casing member 14 and be threadedly received in the threaded holes 42 of casing member 12.

At the extreme upper end of FIGURE 2 is shown an inlet tube 66 having an interior passageway 68 while at the extreme lower end of FIGURE 2 is shown an outlet tube 70 having an interior passageway 72.

Figure 1:
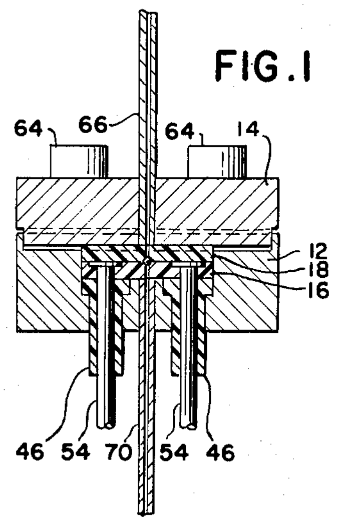
FIGURE 1 is a sectional view of an embodiment of our invention taken through the plane of the axes of the electrical contact members.
Figure 3:
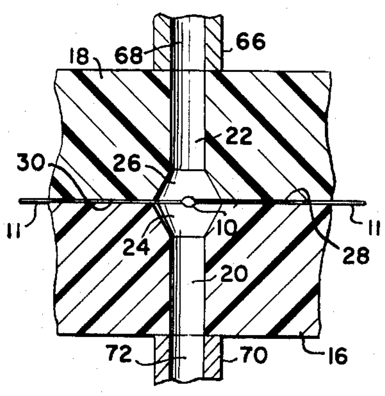
FIGURE 3 is an enlarged, fragmentary, sectional view of a portion of the apparatus shown in FIGURES 1 and 2.

FIGURES 1 and 3 show this particular embodiment of our invention when assembled. In FIGURE 3 it can be seen that thermistor 10 is disposed centrally within the enlarged flared openings 24 and 26 of axial passageways 20 and 22, respectively, with its electrical leads 11 disposed between the confronting upper and lower surfaces 28 and 30 of the lower and upper gaskets 16 and 18, respectively. It can also be seen that the interior passageway 68 of inlet tube 66 registers with and is in communication with axial passageway 22 of upper gasket 18 while the interior passageway 72 of outlet tube 70 registers and is in communication with axial passageway 20 of lower gasket 16. Inlet tube 66 and outlet tube 70 are also in sealing contact with gaskets 18 and 16, respectively. In FIGURE 1 it can be seen that each of the electrical leads 11 from the thermistor 10 overlie one of the heads 56 of electrodes 54. The electrodes 54 are shown with the heads 56 received in the counterbore 34 of gasket 16 and extending through the openings 32 of gasket 16 and the axial holes 52 of insulators 46. The insulators 46 extend through the openings 39 in the lower casing member 12 with the caps 50 disposed in the counterbores 40 about the openings 39. The upper and lower gaskets 18 and 16 are disposed in the central counterbore 36 of lower casing member 12. The four bolts 64 are inserted through the holes 62 in upper casing member 14 and threadedly engaged in the threaded holes 42 in lower casing member 12. The bolts 64 are advanced with the heads thereof bearing against the upper surface of casing member 14 moving casing member 14 downwardly so that the cylindrical extension 58 of casing member 14 is received within the flange 13 of lower casing member 12 and bears against gasket 18 thereby maintaining the confronting surfaces 28 and 30 of gaskets 16 and 18, respectively, in sealing contact.

In the above embodiment thermistor 10 is about 1/64″ in diameter and the electrical leads 11 are from about 1/8″ to less than 1/4″ long. The lower and upper gaskets 16 and 18, respectively, are fabricated from polytetrafluoroethylene and are 0.499″ in diameter and are 0.062″ thick. The axial passageways 20 and 22 extending through the lower and upper gaskets are 0.0225″ in diameter and the enlarged flared openings 24 and 26 reach a maximum diameter of about 1/32″ at the confronting upper and lower surfaces 20 and 22, respectively, of gaskets 16 and 18. The openings 32 through the lower gasket 16 are 0.062″ in diameter with their axes spaced 0.156″ from the axis of passageway 20. The counterbores 34 located about openings 32 are 0.125″ in diameter and 0.020″ deep. The cylindrical electrodes 54 are 14 gage copper wire about 5/8″ long. The flat heads 56 of the electrodes 54 are 0.124″ in diameter and 0.020″ high, thereby enabling them to be received snugly within counterbores 34. The lower and upper casing members 12 and 14 are fabricated from stainless steel. The lower casing member 12 has an outer diameter of 1″ and an overall height of 0.375″. The peripheral flange 13 of the lower casing member 12 has an inner diameter 0.937″ and a height 0.093″. The upper casing member 14 has a diameter of 1″ and an overall height of 1/4″. The circular extension 58 of upper casing member 14 has a diameter 0.934″ and a depth of 1/16″. The electrode insulators 46 are fabricated from polytetrafluoroethylene. Without going into further detail, the counterbore 36 of casing member 12 is of sufficient size to receive both the lower and upper gaskets 16 and 18, and the openings 39 through lower casing member 12 and their counterbores 46 are dimensioned so as to receive electrode insulators 46. The inlet and outlet tubes 66 and 70, respectively, are stainless steel and have an outer diameter of 1/16" and an inner diameter of 3/64". The inlet and outlet tubes 66 and 70, respectively, are held in place by being silver soldered to the casing members 14 and 12, respectively.

In operation gases are introduced into inlet tube 66 and passed through axial passageway 22 and the chamber defined by the enlarged flared openings 24 and 26. The gases are removed from the chamber through axial passageway 20 and outlet tube 70. As the gases pass through the chamber they contact and heat thermistor 10 which is connected in an electrical circuit through leads 11 and electrodes 54 to a device for measuring resistivity. Any of the devices well known in the art can be employed. For example, a Wheatstone bridge having thermistor 10 in one arm and a temperature stabilized reference thermistor of the same type in an adjacent arm can be employed. The variations in resistivity registered in the Wheatstone bridge can then be graphically transcribed by a servo operated graphic recorder.

In the embodiment just described the effective detector volume (within the chamber) is approximately 1.5 microliters and the thermistor volume is approximately 0.03 microliter. In repeated tests employing a carrier gas flow of 0.5 milliliter per minute (8.3 microliters per second) the smallest time interval between resolvable output peaks from the thermistor was 0.2 second computed as follows:

$$t=\frac{\text{eff. volume}}{\text{flow rate}}$$
$$=\frac{1.5\text{ microliters}}{8.3\text{ microliters/sec.}}$$
$$=0.2\text{ second}$$

The advantage obtained from an apparatus in accordance with our invention can readily be seen by comparing the effective volume of 1.5 microliters obtained in the embodiment discussed above as opposed to the effective detector volume of 25 microliters employed in a commercial flame ionization detector. The effective volume of such commercially available detector is more than 15 times greater than that obtained in accordance with our invention.

We claim:

1. An apparatus for measuring the temperature of fluids flowing through a small conduit including a resilient, dielectric body transversely divided along an interfacial plane into a pair of gaskets having confronting surfaces in sealing contact along said plane and means defining a passgeway through said body, said passageway opening at opposite ends of said body and defining an enlarged section at said plane, a thermoelectric element disposed centrally within said enlarged section and having electrical leads extending therefrom and positioned along said interfacial plane between said confronting surfaces, said passageway including the enlarged section having said thermoelectric element disposed therein, having along its length substantially uniform effective cross-sectional area and substantially streamline flow characteristics, and electrical contact members extending through said body with a portion of said members located in said interfacial plane, each said electrical contact member being in electrical contact with a said electrical lead.

2. The apparatus of claim 1 in which said dielectric body comprises a pair of gaskets in sealing contact along said interfacial plane.

3. The apparatus of claim 1 which further includes means retaining said confronting faces in sealing contact and means retaining said leads and said contact members in electrical contact.

4. An apparatus for measuring the temperature of fluids flowing through a small conduit including a pair of coaxially disposed cylindrical, resilient dielectric discs having confronting, substantially flat surfaces, each of said discs having an axial passageway opening at one end thereof at the confronting surface of said disc and opening at the other end thereof at a point remote from said confronting surface, said one ends of said axial passageways having enlarged sections which register at said confronting surfaces, a bead shaped thermistor positioned centrally within said enlarged sections and having comparatively small dimensions such that the free cross-sectional area of said enlarged sections, including said thermistor, is substantially uniform with the cross-sectional area of said passageway in each of said discs, said thermistor also having a pair of electrical leads extending therefrom between said confronting surfaces, said leads extending in diametrically opposite directions relative to the axis of said passageways a lesser distance from said axis than the periphery of said discs, a pair of electrical contact members disposed generally parallel to the axis of said passageways on diametrically opposite sides of said axis extending through one of said discs with the one ends of said contact members flush with the confronting surface of said one disc and the other ends of said contact members extending substantially beyond said one disc in the direction opposite said confronting surface, said electrical leads further positioned such that each said lead traverses said one end of a said electrical contact member, a pair of casing members having mating surfaces enclosing said pair of discs, one of said casing members having a pair of openings therethrough with a said electrical contact member extending through each said opening, insulating means electrically insulating said electrical contacts from said one casing member, conduit means extending through each said casing member, a said conduit means in fluid tight communication with each said axial passageway through said discs at said other ends thereof, and means cooperating with said casing members urging said mating surfaces together in turn urging said confronting surfaces together in sealing contact thereby maintaining said electrical leads in electrical contact with said electrical contact members.

References Cited by the Examiner

UNITED STATES PATENTS

| | | | |
|---|---|---|---|
| 2,580,182 | 12/1951 | Morgan et al. | 73—204 |
| 3,007,333 | 11/1961 | Chadenson | 73—362 |
| 3,043,128 | 7/1962 | Ayers | 73—23 |
| 3,080,759 | 3/1963 | McQuaid | 73—422 |
| 3,095,746 | 7/1963 | Reinecke | 73—23 |

OTHER REFERENCES

Vapor Phase Chromatography (edited by Desty), published by Butterworths Scientific Publications (London), 1957, page 165 relied on.

Publication: Measurement of Low Velocities in Liquids, AEC Research and Development Report, DP287, June 1958, pages 7, 8 and 14.

LOUIS R. PRINCE, *Primary Examiner.*

ISAAC LISANN, *Examiner.*